W. T. DOREMUS.
Furniture Springs.

No. 137,600. Patented April 8, 1873.

Witnesses:

Inventor:
W. T. Doremus
Per
Attorneys,

UNITED STATES PATENT OFFICE.

WILLIAM T. DOREMUS, OF NEW YORK, N. Y.

IMPROVEMENT IN FURNITURE-SPRINGS.

Specification forming part of Letters Patent No. 137,600, dated April 8, 1873; application filed March 15, 1873.

*To all whom it may concern:*

Figure 1:
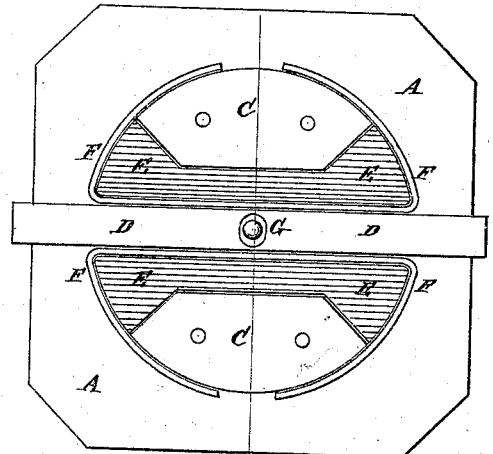
Figure 2:
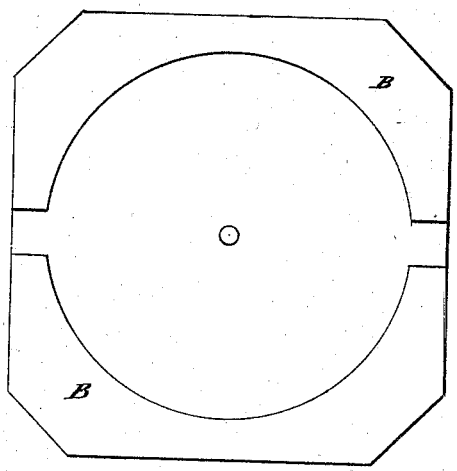
Figure 3:
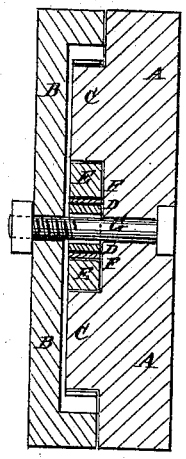

Be it known that I, WILLIAM T. DOREMUS, of the city, county, and State of New York, have invented a new and useful Improvement in Furniture-Springs, of which the following is a specification:

Figure 1 is a detail view of the inner side of one part of the spring. Fig. 2 is a detail view of the inner side of the other part of the spring. Fig. 3 is a detail sectional view of the spring taken on the line $x\ x$, Fig. 1.

My invention has for its object to furnish an improved spring for chairs, bed-bottoms, and other articles of furniture, and which shall be simple in construction, convenient in application, and effective in use.

The invention consists of an improved spring formed by the combination, with each other, of the case, made in two parts oscillating upon each other, the cross-bar, the rigid blocks or projections, and rubber blocks; in the combination of the open bands with the parts of the case, the cross-bar, the rigid blocks or projections, and rubber blocks, as hereinafter fully described.

A and B are the two parts of the box or case of the spring. To the part A is attached or upon it are formed one or more rigid blocks or projections, C, the form of which is immaterial. In the face or inner side of the other part B is formed a recess to receive the blocks or projections C of the plate A. In the inner part of the plate B is also formed a transverse groove to receive a cross-bar, D, which passes across the face of the part A between the blocks or projections C. E are rubber springs interposed between the bar D and the blocks or projections C, and the form of which must depend upon the form of the said blocks or projections C. F are open metallic bands passing around the rubber blocks E and the blocks or projections C, to prevent the rubber blocks E from bulging or spreading when under pressure, and also to prevent the wear of said rubber blocks by friction as the parts of the case move upon each other. The open bands F also enter the recess in the part B of the case. The parts A B are held and pivoted to each other, and the cross-bar D is kept from longitudinal movement by a bolt, G, passing through the said parts A B and through the bar D. This same thing may, however, be accomplished in various other ways.

By this construction, as the one part of the case A B is oscillated or turned back and forth upon its pivoting point, the rubber blocks E will be alternately compressed by the bar D. The rubber blocks E and rigid blocks C may be variously arranged without departing from my invention, as, for instance, the rubber blocks E may be placed in a cavity in the rigid blocks C and pressed alternately upon their opposite sides by curved arms or plungers attached to or formed upon the bar D and working in holes in the blocks C. The case A B may be made of wood or metal, and of any desired size or form, according as the place in which and the purpose for which the springs are to be used may require. The bar D may also be secured to the plate B by screws or bolts or otherwise, if desired, to secure the necessary motion.

Having thus described my invention, I claim as new and desire to secure by Letters Patent—

1. An improved spring formed by the combination, with each other, of the case A B, made in two parts oscillating upon each other, the cross-bar D, the rigid blocks or projections C, and rubber blocks E, substantially as herein described.

2. The combination of the open bands F with the parts A B of the case, the cross-bar D, and the rigid blocks or projections C, and rubber blocks E, substantially as herein shown and described.

WILLIAM T. DOREMUS.

Witnesses:
 JAMES T. GRAHAM,
 T. B. MOSHER.